F. MARTIN, Jr.
BROILER.

No. 174,269. Patented Feb. 29, 1876.

WITNESSES:
Alex F. Roberts
Gustave Dieterich

INVENTOR:
Frederic Martin Jr.
BY
ATTORNEYS.

UNITED STATES PATENT OFFICE

FREDERIC MARTIN, JR., OF WEST JEFFERSON, OHIO.

IMPROVEMENT IN BROILERS.

Specification forming part of Letters Patent No. 174,269, dated February 29, 1876; application filed December 18, 1875.

*To all whom it may concern:*

Figure 1:
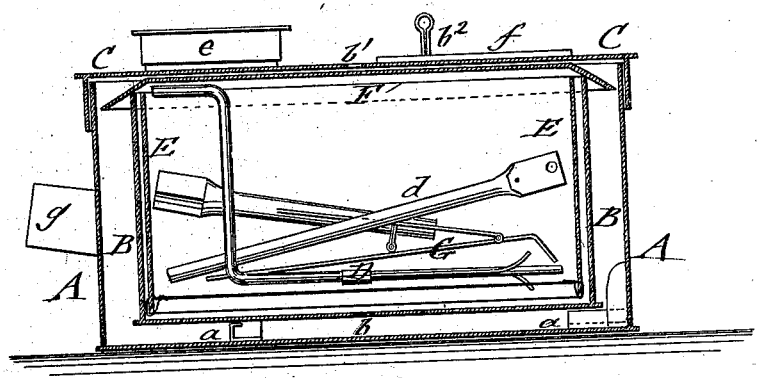
Figure 2:
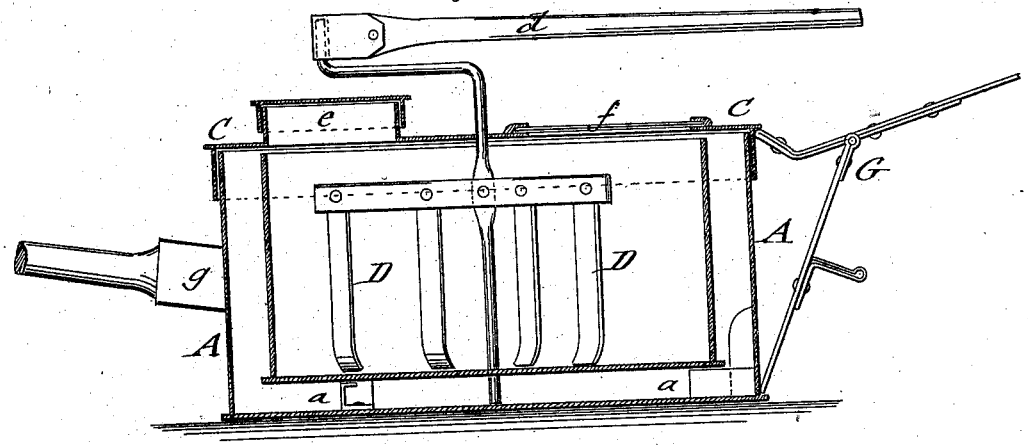
Figure 3:
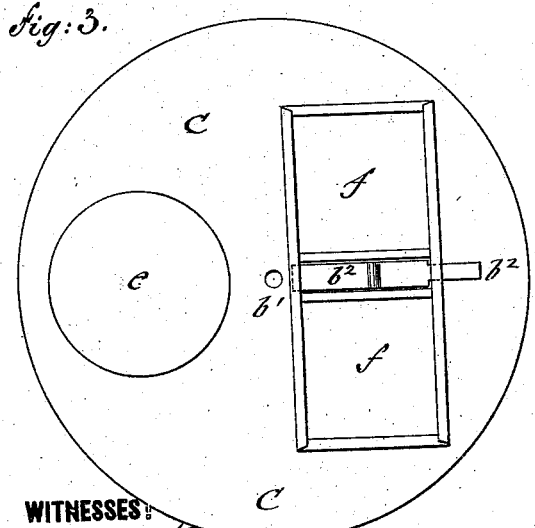

Be it known that I, FREDERIC MARTIN, Jr., of West Jefferson, in the county of Madison and State of Ohio, have invented a new and Improved Combined Broiler and Roaster, of which the following is a specification:

In the accompanying drawing, Figure 1 represents a vertical central section of my improved broiler and roaster combined, showing attachments stored away at the inside. Fig. 2 is a vertical central section of the broiler arranged to be used as a coffee-roaster. Fig. 3 is a top view of the broiler, and Fig. 4 a top view of a cylindrical vessel, with wire bottom, to be inserted into the outer vessel for broiling.

Similar letters of reference indicate corresponding parts.

My invention relates to an improved culinary vessel, that may be employed for broiling and baking, roasting coffee, and other purposes.

The invention consists in a flat-bottomed case, having a lid with a central hole, provided with a pan having central bottom hole, and having a vertical crank-shaft with stirrers thereon, all as hereinafter fully described.

In the drawing, A represents the outer vessel, of cylindrical shape and suitable size; B, an inner vessel, of smaller diameter, that is supported on rests $a$ at the bottom of the outer vessel A. The vessel or pan B has a central bottom hole, $b$, which serves, in connection with a top hole, $b^1$, of the lid C of vessel A, to support the crank-shaft of the revolving stirrers D, which are employed when it is desired to roast coffee. A handle, $d$, of suitable length, is applied to the upper end of the stirrer-shaft, and thereby the stirrers revolved without annoyance to the hands by the heat. The lid C is fitted tightly on vessel A, so that no vapors may escape. It is provided with a top hole and lid $e$, through which the articles may wholly or in part be taken out without taking off the lid. The lid is further provided with two windows, $f$, of isinglass, through which the coffee or other articles at the inside may be watched without opening the lid. A slide, $b^2$, of the lid serves to close the central shaft-hole of the same when the vessel is used for other purposes.

Figure 4:
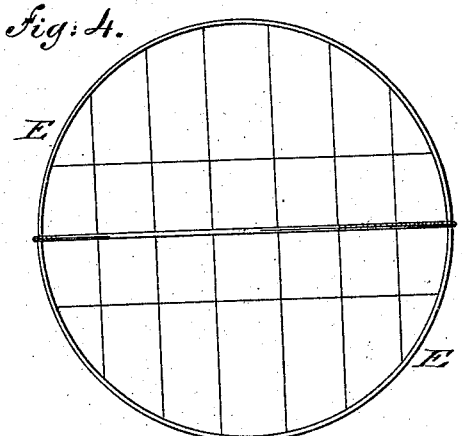

A second interior vessel, E, with open wire bottom and wire bail, shown in Fig. 4, serves, in connection with a drip-pan, F, placed below the same, for broiling, cooking potatoes, baking, and other purposes, in which cases the roasting-vessel B is removed.

The broiler may be carried by a suitable wooden handle, inserted into a socket, $g$, at the outer vessel A, and the lid opened readily, without burning the fingers, by means of a lifting-jack, G, shown in Fig. 2, by being applied to the top rim of the lid and the bottom rim of vessel A.

The vessel may be employed for a variety of purposes, and all the parts stored after use in the interior of the same, to be placed out of the way.

Having thus described my invention, I claim as new and desire to secure by Letters Patent—

The combination, with a flat-bottomed case, having central hole $b^1$ in its lid, of the pan B, having center hole $b$ in its bottom, and the vertical shaft, having horizontally-rotary stirrers on a cross-bar thereof, as and for the purpose described.

FREDERIC MARTIN, JR.

Witnesses:
THEODORE B. FELLOWS,
SAMUEL M. STICKLEY.